(12) United States Patent
Ishii

(10) Patent No.: US 8,381,431 B2
(45) Date of Patent: Feb. 26, 2013

(54) MOSQUITO TRAPPING EQUIPMENT UTILIZING HER HABIT AND GRAVITATIONAL FORCE

(76) Inventor: Yoshiyuki Ishii Ishii, Tokyo (JP)

( * ) Notice: Subject to any disclaimer, the term of this patent is extended or adjusted under 35 U.S.C. 154(b) by 150 days.

(21) Appl. No.: 12/953,016

(22) Filed: Nov. 23, 2010

(65) Prior Publication Data

US 2012/0117858 A1 May 17, 2012

(30) Foreign Application Priority Data

Nov. 16, 2010 (JP) ................................. 2010-255441

(51) Int. Cl.
*A01M 5/00* (2006.01)
(52) U.S. Cl. ................. 43/139; 43/122; 43/144
(58) Field of Classification Search ............ 43/107, 43/122, 124, 132.1, 133, 138–140, 144
See application file for complete search history.

(56) References Cited

U.S. PATENT DOCUMENTS

| | | | | |
|---|---|---|---|---|
| 1,693,368 A * | 11/1928 | Cherry | ............................. | 43/113 |
| 4,603,505 A * | 8/1986 | Millard | ............................ | 43/112 |
| 4,785,573 A * | 11/1988 | Millard | ............................ | 43/112 |
| 4,962,611 A * | 10/1990 | Millard | ............................ | 43/112 |
| 5,329,725 A * | 7/1994 | Bible | ............................. | 43/113 |
| 5,647,164 A * | 7/1997 | Yates | ............................... | 43/139 |
| 5,669,176 A * | 9/1997 | Miller | .............................. | 43/139 |
| 6,145,243 A | 11/2000 | Wigton et al. | | |
| 6,530,172 B2 * | 3/2003 | Lenz | ............................... | 43/112 |
| 6,779,296 B1 | 8/2004 | Mosher, II | | |
| 6,817,139 B1 * | 11/2004 | Powell et al. | .................... | 43/113 |
| 6,925,752 B1 * | 8/2005 | Cherry et al. | ................... | 43/139 |
| 7,234,268 B2 * | 6/2007 | Welch | ............................ | 43/112 |
| 7,293,388 B2 * | 11/2007 | DeYoreo et al. | ................. | 43/139 |
| 7,752,803 B2 * | 7/2010 | Miller et al. | .................... | 43/139 |
| 7,802,398 B2 * | 9/2010 | Kulkarni et al. | ................. | 43/139 |
| 2003/0084604 A1 | 5/2003 | Durand et al. | | |

OTHER PUBLICATIONS

Dr. Cameron Webb PhD et al., A comparison of four commercially available adult mosquito, Report, Aug. 2005, p. 2 of line 23-26 description of Black Hole. Page 3 of Results and discussion section line 3-5, Institute of Clinical Pathology and Medical Research, Sydney, Austorallia.
Osamu Araki, Science on a mosquito, Aug. 30, 2007, p. 37-38, NDC486, Nikkan Kogyo Shinbunsha, Tokyo, Japan.

* cited by examiner

*Primary Examiner* — David Parsley

(57) ABSTRACT

The invented equipment attracts mosquitoes in long distance by carbon dioxide which is created by combustion of kerosene and in short distance by temperature of a landing wall which is warmed up by exhaust gas of the combustion, utilizes not only intake air flow and habit of the mosquitoes to bite but also gravitational force, then effectively and economically traps the mosquitoes which land on the mosquito landing wall.

5 Claims, 3 Drawing Sheets

MOSQUITO TRAPPING EQUIPMENT UTILIZING HER HABIT AND GRAVITATIONAL FORCE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of Invention

The invention relates to insects traps, more particularly to devices for attracting, and trapping mosquitoes.

2. Description of Prior Art

Female mosquitoes bite human and pets and not only irritate them but also can be carriers of malaria, yellow fever, dengue fever, and West Nile fever.

To overcome the above troubles, mosquito coil, chemical repellant are utilized, but they are not effective in reducing population of mosquitoes in large numbers.

In order to reduce the population of mosquitoes, several trapping equipments are developed and commercialized such as trademark "MOSQUITO MAGNET." MOSQUITO MAGNET attracts and catches flying mosquitoes by carbon dioxide in long distance, and by other chemical attractant in short distance. Other trapping equipments catch mosquitoes in a similar way. However, as described in U.S. Pat. No. 6,779,296 to Robert F. Mosher, II, MOSQUITO MAGNET itself is very expensive, and its running cost is also very high. Furthermore, MOSQUITO MAGNET needs special chemical attractant for Asian tiger mosquito (*Aedes albopictus*) which transmits dengue fever virus.

Another type of mosquito trapping equipment is commercialized and named Black Hole. The equipment creates carbon dioxide by a photo-catalysis process and UV light, but trapping performance is poor as described by Cameron, A comparison of four commercially available adult mosquito traps, August 2005, pp 3.

There are several methods to create carbon dioxide. The first method is combustion of kerosene, the second one is combustion of liquefied propane, the third one is combustion of liquefied natural gas, the fourth one is fermentation of sugar, the fifth one is liquefied carbon dioxide, the sixth one is chemical reaction of acid with carbonate. Assuming that kerosene price for creation of 1 mol of carbon dioxide is 100, the liquefied propane is approximately 400, the liquefied natural gas is roughly 90, fermentation of sugar is 1,200, liquefied carbon dioxide is 1,000, the chemical reaction of foods grade citric acid with sodium bicarbonate is 9,200. Relatively, liquefied natural gas is inexpensive but it is based on LNG car gas station price and a small bottle is much expensive. Then, the kerosene is selected to create carbon dioxide for the present invention.

Several equipments are patented or Patent published. Equipment of U.S. Pat. No. 6,145,243 to Bruce E. Wigton et al has attractant exhaust system coupled to the carbon dioxide gas source. The present invention does not need any attractant other than carbon dioxide. This structural difference clearly distinguishes the present invention from the prior inventions.

Equipment of U.S. Pat. No. 6,779,296 to Robert F. Mosher, II does not have such a mosquito landing wall which is warmed up by combustion energy as a crucial element in the present invention. Thus, the prior invention is substantively different from the present invention.

Equipment of U.S. Patent Application Publication No. 2003/0084604 by Emma A. Durand et al is a flying insect trapping one. Then, the prior invention has no such mosquito landing wall as the present invention has. This structural difference clearly distinguishes the present invention from the prior inventions.

As described by Osamu Araki, Science on a mosquito (in Japanese), 2007, pp 37 and 38, mosquitoes fly in long distance, searching for high concentration of carbon dioxide. Once they find a concentrated carbon dioxide area, they use their palps to sense heat to suck blood from mammals.

BRIEF SUMMARY OF THE INVENTION

The invented equipment, in long range, attracts mosquitoes by carbon dioxide which is created by combustion of kerosene inside of the equipment and is exhausted to outside through the mosquito container of the equipment. The attracted mosquitoes are flying around the equipment, detect temperature of the landing wall warmed up by thermal energy of the combustion, then land on the landing wall, bite, walk around or make a small jump to find blood as their habit. When mosquitoes make a small jump, airflow to inlet of the equipment make mosquitoes to lose their balance and they slowly fall down by additional gravitational force. Thus, the equipment effectively and economically catches mosquitoes.

Figure 1:
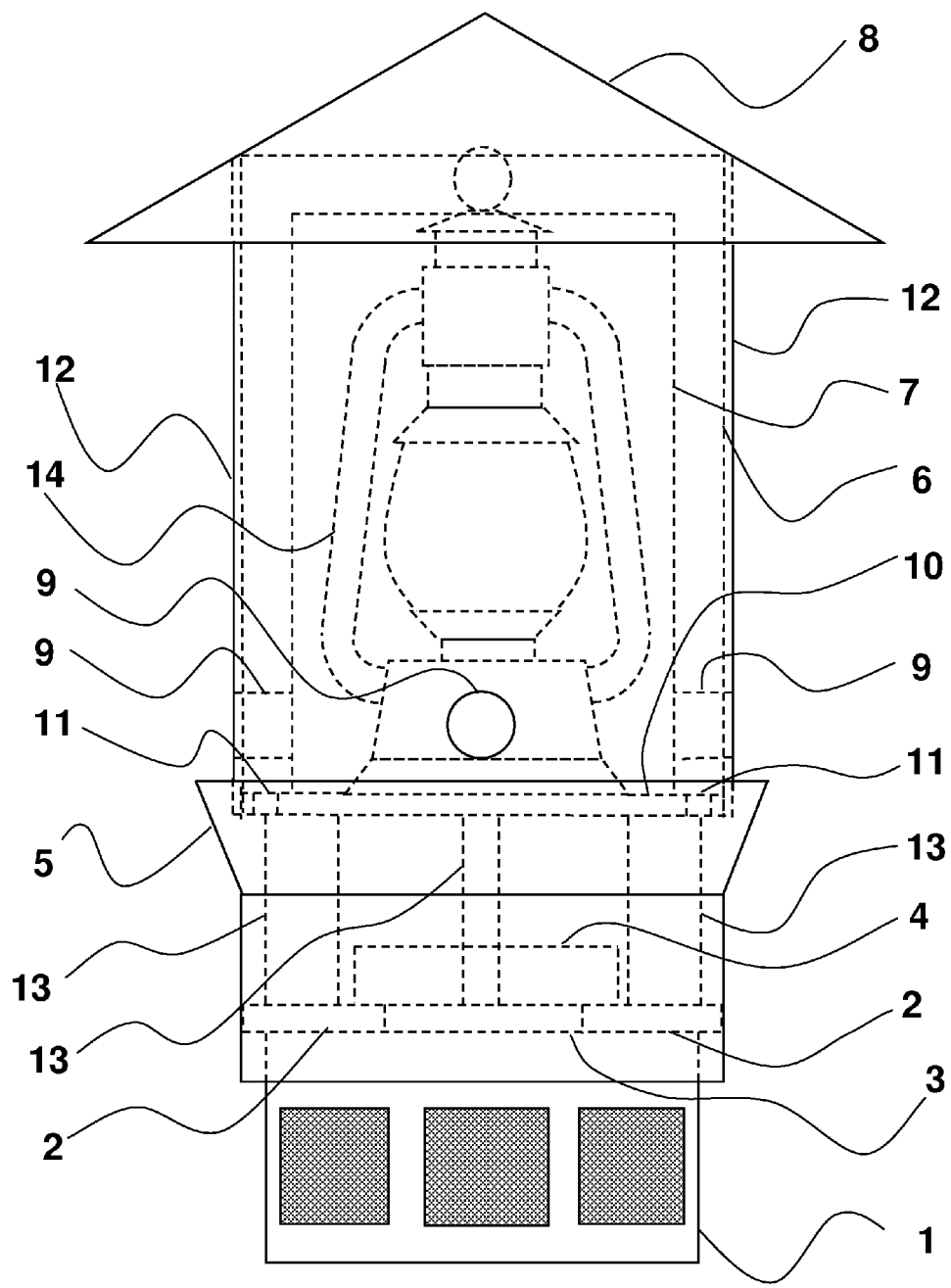
FIG. 1 shows front view of the present invention.

| List of Reference Numerals | |
|---|---|
| 1 | Container |
| 2 | Cap |
| 3 | Hole |
| 4 | Electric fan |
| 5 | Trapping tube |
| 6 | Outer tube |
| 7 | Inner tube |
| 8 | Roof |
| 9 | Connecting tube |
| 10 | Base plate |
| 11 | Through-hole |
| 12 | Mosquito landing wall |
| 13 | Post |
| 14 | Kerosene lantern |
| 15 | Holed and cut base plates |
| 16 | Burner |
| 17 | Holed base plate |
| 18 | Holed trapping tube |
| 19 | Kerosene tank |
| 20 | Connecting tube |
| 21 | Table |
| 22 | Table with a sliding shaft guide |

-continued

| List of Reference Numerals | |
|---|---|
| 23 | Tank plate |
| 24 | Sliding shaft |
| 25 | Coil spring |
| 26 | Compact kerosene tank |

DETAILED DESCRIPTION OF THE INVENTION

The invented equipment is composed of a mosquito container 1 which has a meshed portion and enables to pass through gas but not mosquitoes. A cap 2 is located to cover the mosquito container 1 and the cap 2 has a hole 3. An electric fan 4 is set over the hole, a trapping tube 5 surrounds the cap 2, and the upper part of the trapping tube 5 has a horn aperture. The equipment has double tubes inside of the trapping tube 5. An inner tube 7 is set on a base plate 10 which is supported by posts 13 which are set on the cap 2. A bottom part of a outer tube 6 surrounds the base plate 10. Gap between the horn aperture of the trapping tube 5 and the outer tube 6 is inlet of both air and mosquitoes. A height of the inner tube 7 is lower than the outer tube 6, and a roof 8 is located to cover the outer tube 6. The inner tube 7 and the outer tube 6 is connected by connecting tubes 9 which hold the outer tube 6 and enable air intake. A kerosene lantern 14 is set on the base plate 10 inside of the inner tube 7. The mosquito landing wall 12 is formed on the surface of the outer tube 6 except holes of connecting tubes 9. Through-holes 11 are made on the base plate 10 between the inner tube 7 and the outer tube 6 to pass exhausted gas of the kerosene lantern 14.

When the electric fan 4 is put on and a fire is put on the kerosene lantern 14, air is taken through the connecting tubes 9. Exhaust gas of the kerosene lantern 14 heats up the roof 8 and the outer tube 6 and goes via the through-holes 11, being mixed with fresh air from the horn aperture of the trapping tube 5, the electric fan 4, and the hole 3, to the mosquito container 1. Finally, the exhaust gas is discharged from the equipment.

Mosquitoes are attracted by the discharged carbon dioxide and fly around the equipment, detect the temperature of the mosquito landing wall 12 warmed up by the exhaust gas, and land on the surface. Mosquitoes, this way or that way, try a bite, a walk and a small jump on the mosquito landing wall 12. When the mosquitoes make a small jump, they lose their balance caused of intake airflow and are fallen to the horn aperture of the trapping tube 5 by gravitational force The mosquito landing wall 12 takes an important role in the present invention because it prevents outer tube 6 from cooling down by airflow and also simulates clothes of human. Without the mosquito landing wall 12, mosquitoes land on a upper part of the outer tube 6 and trapping number of mosquitoes decreases.

Two types of the present invention A and B are operated. Type A has larger diameter of the connecting tube 9 than type B. Both are operated with hurricane lanterns which have capacity of 345 ml, ⅜ inch wick and nominal burning time of 20 hours. The trial operation was done in small fire and continued more than 24 hours.

The actual operation was started on Sep. 17, 2010 at the metropolitan area in Tokyo but the type B was stopped after two days due to an accident. The type A operation continued until Oct. 17, 2010. Each morning, trapped number of mosquitoes was counted and kerosene was refilled. Table 1 shows the result of operation with high and low ambient temperature in Celsius. Date responds to actual date of temperature and counted number, so there is one-day delay in counted number. Even it took place in autumn, when mosquitoes are less active than summer, a large number of mosquitoes was counted and data has proved the effectiveness of the present invention.

TABLE 1

| Date | Trapped number | Accumulated number | Temperature High | Temperature Low | Remarks |
|---|---|---|---|---|---|
| September 17 | | | 29.6 | 23.1 | |
| 18 | 97 | 97 | 29.1 | 19.8 | No operation |
| 19 | | 97 | | | No temperature data |
| 20 | 17 | 114 | 29.7 | 22.9 | |
| 21 | 16 | 130 | 28.8 | 24.3 | |
| 22 | 28 | 158 | 32.7 | 24.6 | |
| 23 | 53 | 211 | 24.8 | 16.8 | No operation |
| 24 | | 211 | 20.2 | 15.8 | |
| 25 | 18 | 229 | 22.0 | 13.9 | |
| 26 | 141 | 370 | 24.6 | 14.8 | |
| 27 | 19 | 389 | 17.8 | 15.6 | No operation |
| 28 | | 389 | 22.8 | 16.0 | |
| 29 | 142 | 531 | 25.6 | 19.6 | |
| 30 | 218 | 749 | 22.0 | 18.1 | |
| October 1 | 4 | 753 | 24.2 | 18.1 | |
| 2 | 134 | 887 | 24.9 | 19.2 | |
| 3 | 84 | 971 | 24.9 | 17.3 | |
| 4 | 42 | 1,013 | 22.6 | 18.1 | |
| 5 | 16 | 1,029 | 26.9 | 19.5 | |
| 6 | 52 | 1,081 | 25.7 | 19.7 | |
| 7 | 10 | 1,091 | 24.8 | 18.0 | |
| 8 | 1 | 1,092 | 25.0 | 18.9 | |
| 9 | 26 | 1,118 | 19.1 | 16.7 | |
| 10 | 3 | 1,121 | 23.6 | 16.8 | |
| 11 | 31 | 1,152 | 28.3 | 17.8 | |
| 12 | 167 | 1,319 | 24.4 | 15.3 | |
| 13 | 94 | 1,413 | 26.1 | 20.8 | |
| 14 | 138 | 1,551 | 23.4 | 19.5 | |
| 15 | 74 | 1,625 | 23.6 | 19.3 | |
| 16 | 64 | 1,689 | 24.8 | 18.6 | |
| 17 | 37 | 1,726 | 23.3 | 18.5 | |
| 18 | 24 | 1,750 | | | |

Anyone who observes the trapping process of the present invention may have the question why mosquitoes do not fly but slowly fall to the trapping tube 5. The answer is that mosquitoes make a big jump before their flight using relatively long and strong legs to their body, but they cannot make a big jump once they make a small jump and their legs are off the mosquito landing wall 12.

Figure 2:
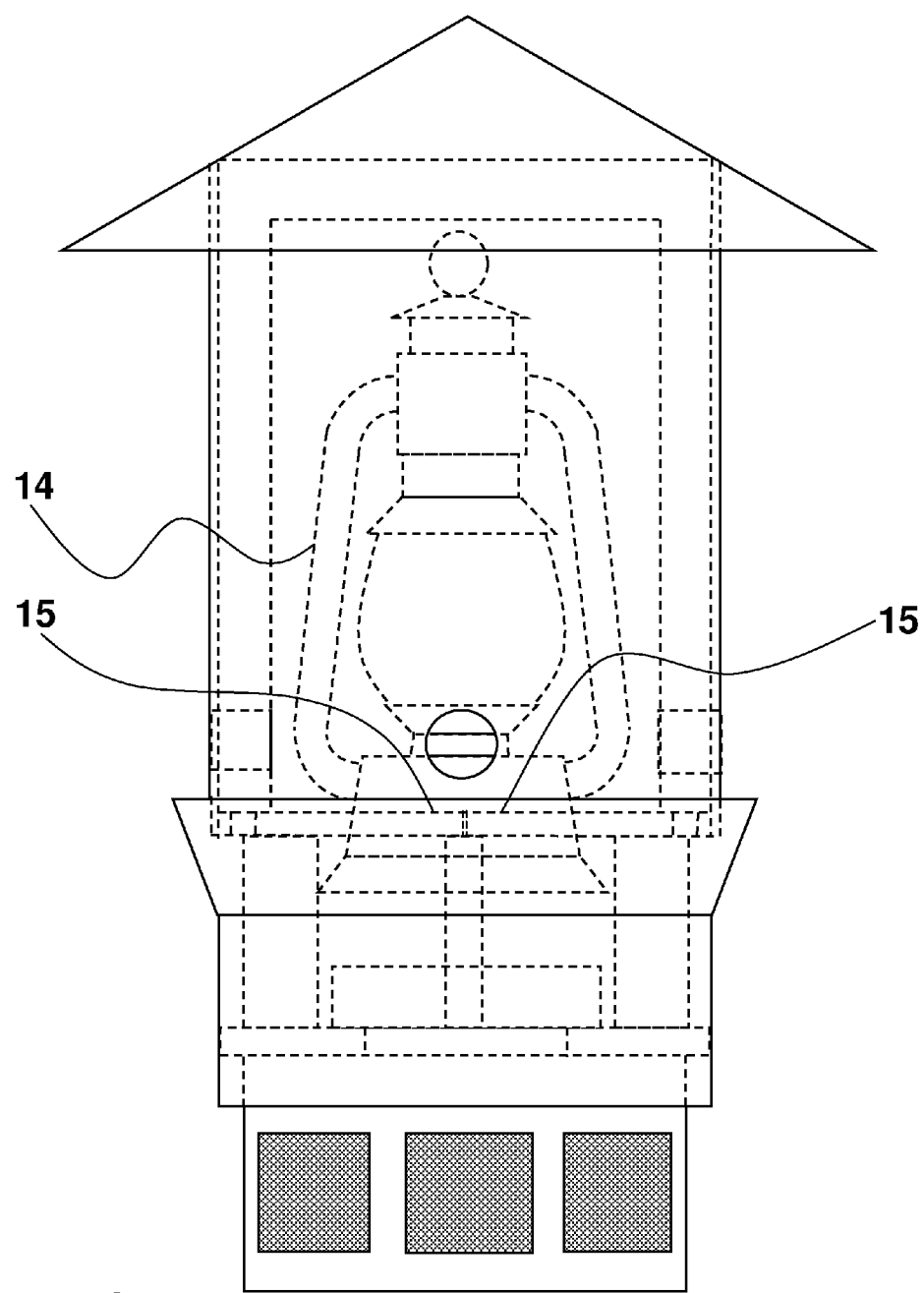
FIG. 2 shows front view of the modified present invention.

As temperature of a kerosene bottle of the type B equipment got higher, evaporated kerosene caught fire other than wick because of small amount of fresh air intake. As a result of this accident, configuration was modified in the present invention as shown in FIG. 2. The base plate 10 shown in FIG. 1 is holed and cut into two pieces which are holed and cut base plates 15 as shown in FIG. 2. The holed and cut base plates 15 are fixed to surround the bottle of kerosene lantern 14. Thus, a lower part of the bottle can be cooled down by fresh air, and problem of abnormal combustion is solved.

Figure 3:
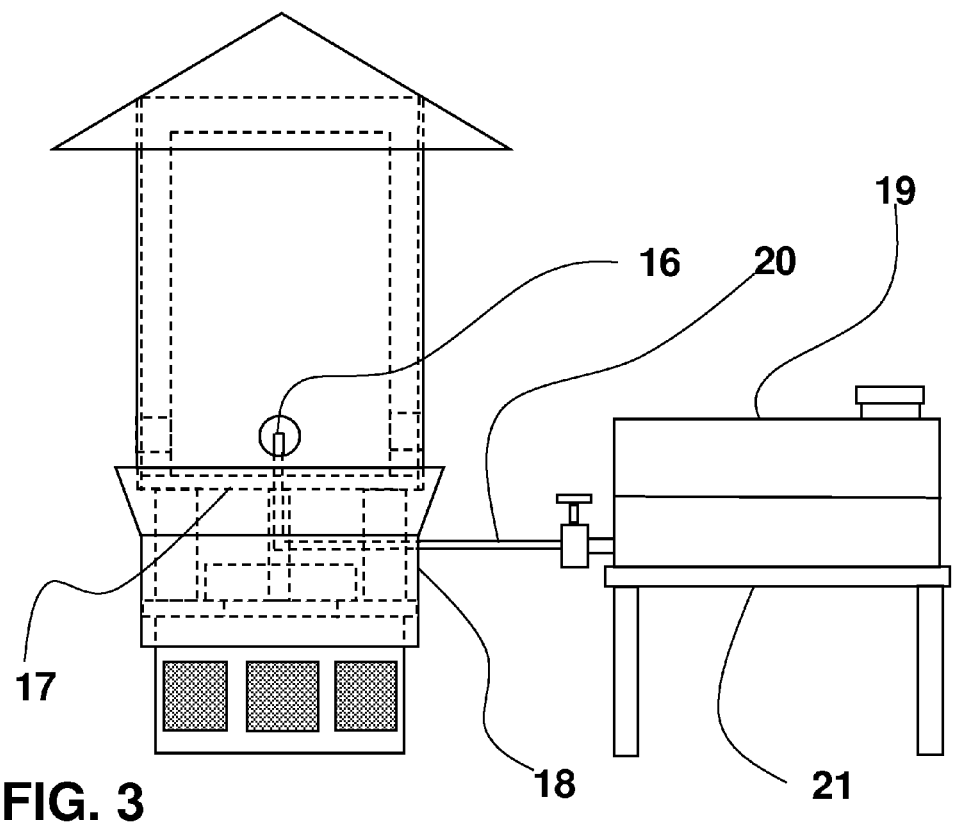
FIG. 3 shows front view of the further modified present invention.

In practical use of the invented equipment, daily refill of kerosene is inconvenient. A kerosene tank 19 is set on a table 21 to keep adequate kerosene level between a burner 16 and the kerosene tank 19, and they are connected each other by a connecting tube 20 which passes through a holed base plate 17 and holed trapping tube 18 as shown in FIG. 3.

Figure 4:
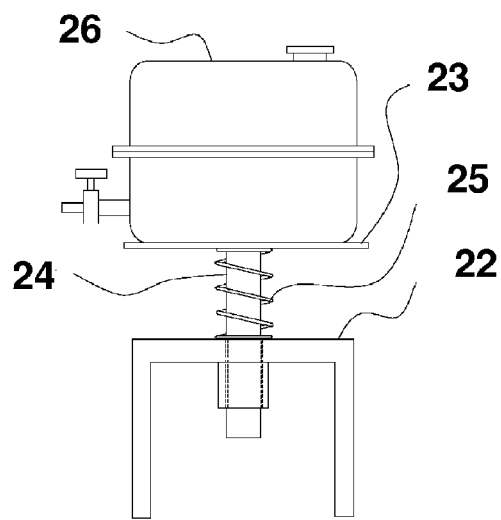
FIG. 4 shows front view of another further modified present invention.

Kerosene is soaked up to a burner by capillary action in the wick and height of the kerosene tank is limited to a few centimeters. Thus, the shape of the kerosene tank 19 is flat and not easy to keep level. In order to improve the inconvenience, the table 21 in FIG. 3 is modified and a sliding guide is attached. The modified table is shown as a table with a sliding shaft guide 22 in FIG. 4. A sliding shaft 24 is placed and a tank plate 23 is fixed at a top of the sliding shaft 24. The sliding shaft is inserted to a coil spring 25 which is placed between the tank plate 23 and the table with a sliding shaft guide 22. Selecting adequate spring strength, level of kerosene in a compact kerosene tank 26 can be kept constant. Thus, the invented equipment can be operated for longer time without refilling kerosene.

The invention claimed is:

1. A mosquito trapping equipment comprising;
   (1) a container made fully or partially by material easily to pass gas, but not to pass mosquitoes,
   (2) a cap being placed on said container,
   (3) a hole being placed on said cap to pass said gas and said mosquitoes,
   (4) an electric fan being set to cover said hole,
   (5) a trapping tube being set on said cap,
   (6) double tubes being located on the inside of said trapping tube, and height of an inner tube of said double tubes being lower than an outer tube of said double tubes,
   (7) a roof covering upper edge of said outer tube,
   (8) connecting tubes locating higher than upper edge of said trapping tube, and connecting said inner tube with said outer tube to have fluid communication between an outside of said outer tube and an inside of said inner tube,
   (9) a base plate being set on lower edge of said inner tube, and being tightly surrounded by lower part of said outer tube,
   (10) though-holes being placed on said base plate between said inner tube and said outer tube,
   (11) low thermally conductive layer covering an outer surface of said outer tube and not covering orifices of said connecting tubes,
   (12) posts holding said base plate and being placed on said cap, and
   (13) a kerosene burner is set inside said inner tube, below said roof, and above said base plate.

2. The equipment as in claim 1 wherein said kerosene burner is a kerosene lantern and placed on said base plate.

3. The equipment as in claim 1 wherein said kerosene burner is a kerosene lantern of which a kerosene reserving part is located under said base plate and cooled down by said electric fan to avoid abnormal combustion.

4. The equipment as in claim 1 wherein said kerosene burner is connected by a pipe with a tank which is located away from said mosquito trapping equipment.

5. The equipment as in claim 1 wherein said kerosene burner is connected by a flexible pipe with a big kerosene tank which is located away from said mosquito trapping equipment, and said big kerosene tank is combined with kerosene level keeping apparatus to offer longer operating time.

\* \* \* \* \*